Jan. 21, 1964 C. D. SNELLING 3,118,800
METHOD AND APPARATUS FOR MAKING FLEXIBLE CONDUITS
HAVING AN ANNULAR WALL OF FOAMED PLASTIC
Filed Aug. 21, 1959 5 Sheets-Sheet 1
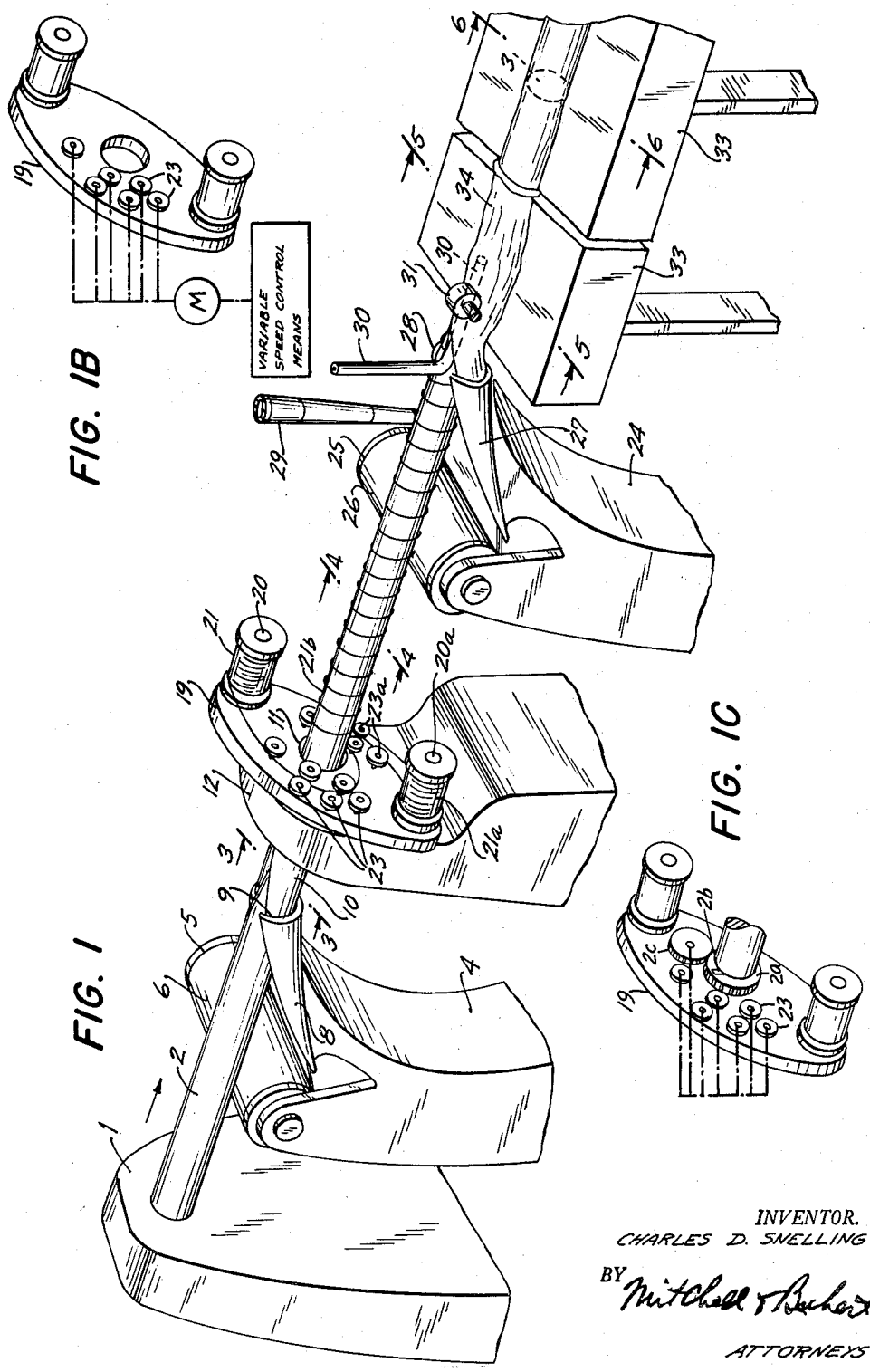
INVENTOR.
CHARLES D. SNELLING
BY
ATTORNEYS

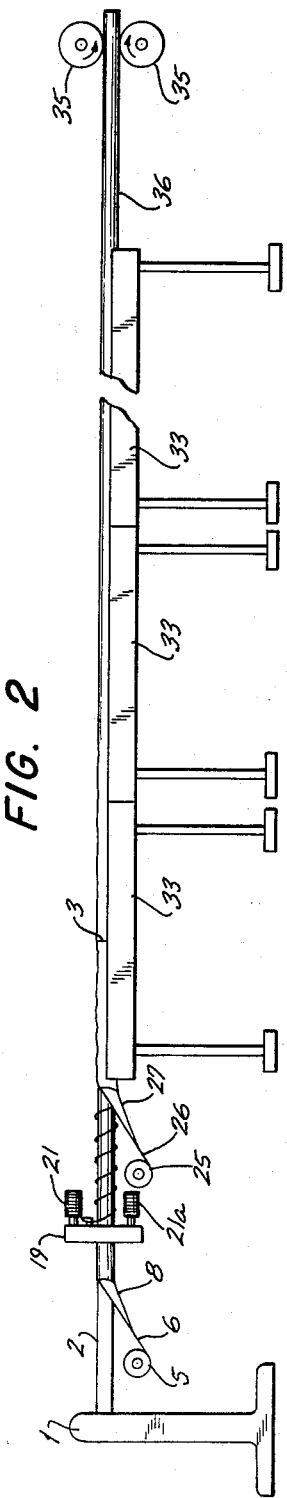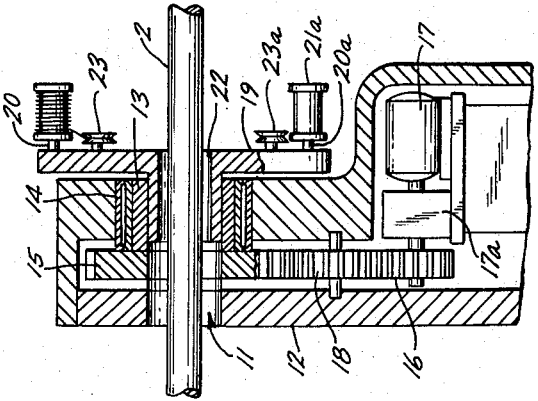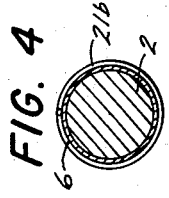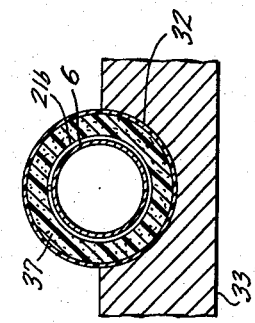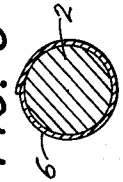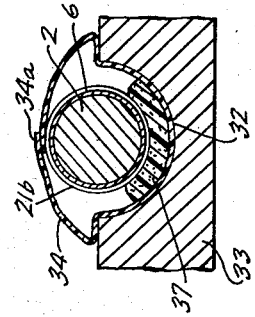
Jan. 21, 1964     C. D. SNELLING     3,118,800
METHOD AND APPARATUS FOR MAKING FLEXIBLE CONDUITS
HAVING AN ANNULAR WALL OF FOAMED PLASTIC
Filed Aug. 21, 1959     5 Sheets-Sheet 2
INVENTOR.
CHARLES D. SNELLING
BY
ATTORNEYS

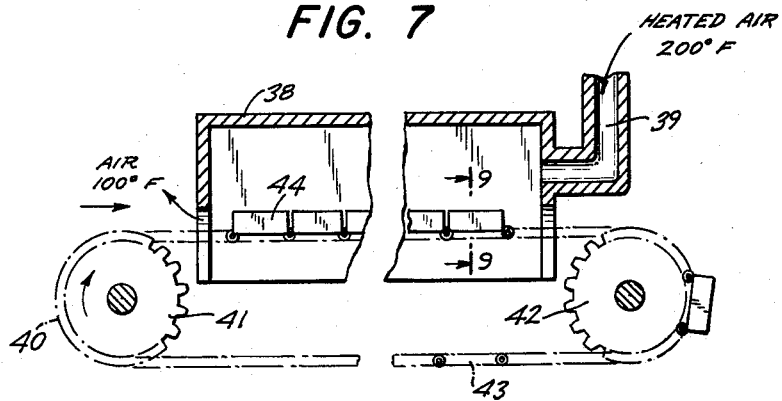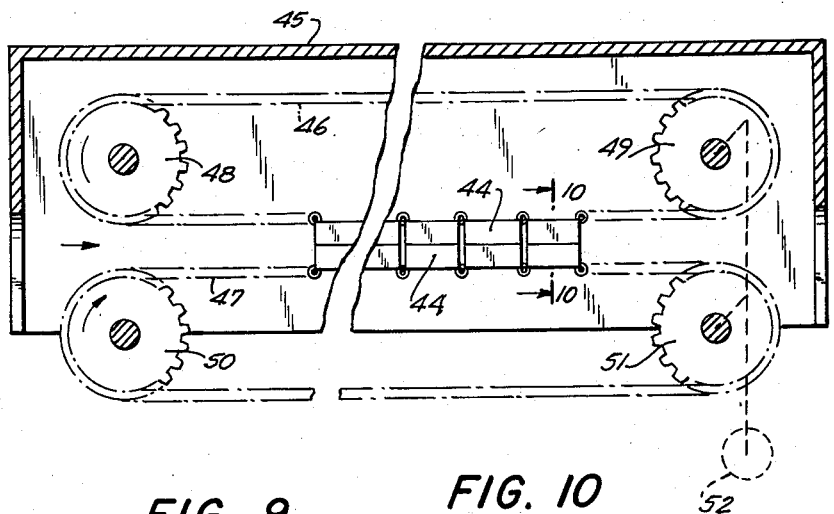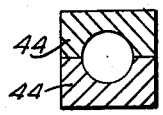

Jan. 21, 1964   C. D. SNELLING   3,118,800
METHOD AND APPARATUS FOR MAKING FLEXIBLE CONDUITS
HAVING AN ANNULAR WALL OF FOAMED PLASTIC
Filed Aug. 21, 1959   5 Sheets-Sheet 5
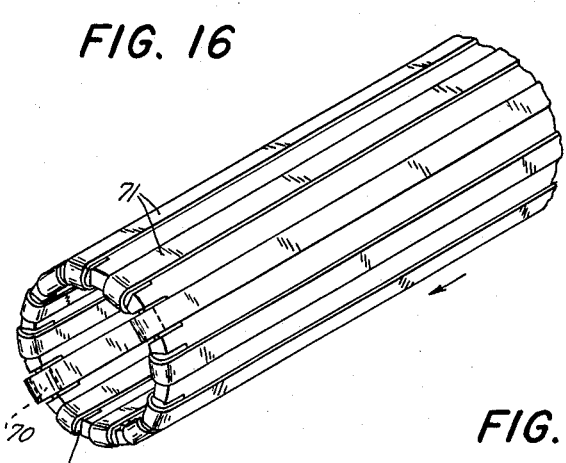
FIG. 16
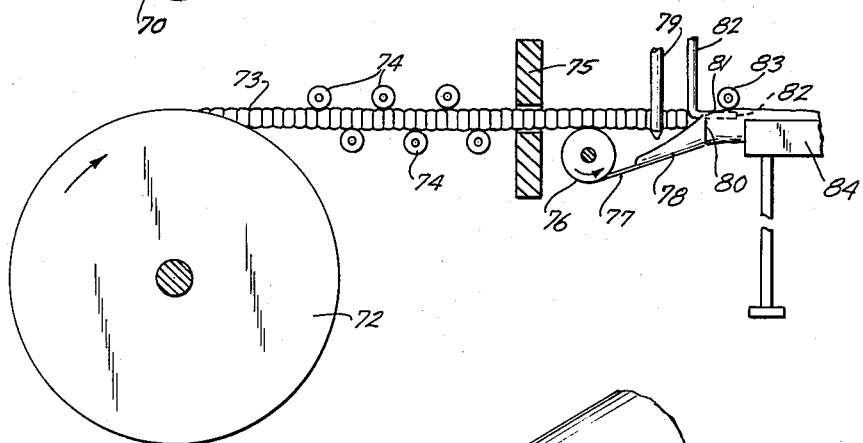
FIG. 17
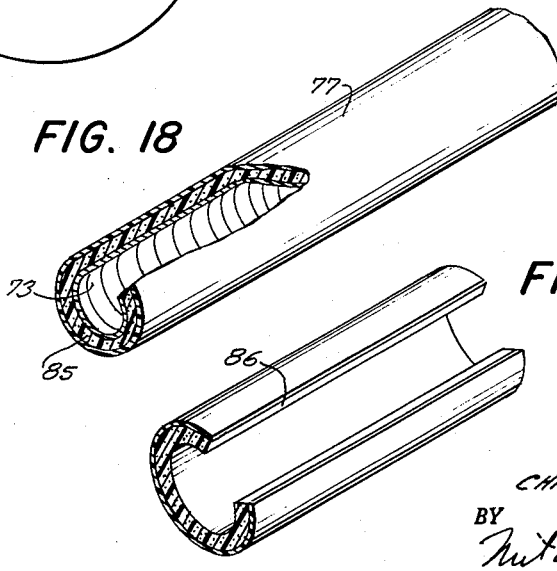
FIG. 18
FIG. 19
INVENTOR.
CHARLES D. SNELLING
BY
*Mitchell & Bechert*
ATTORNEYS

United States Patent Office 3,118,800
Patented Jan. 21, 1964

3,118,800
METHOD AND APPARATUS FOR MAKING FLEXIBLE CONDUITS HAVING AN ANNULAR WALL OF FOAMED PLASTIC
Charles D. Snelling, Breinigsville, Pa.
(% Standard Plastics Inc., Fogelsville, Pa.)
Filed Aug. 21, 1959, Ser. No. 835,324
13 Claims. (Cl. 156—79)

This invention relates to conduits for use in transporting fluid materials and in particular to a method and apparatus for producing conduits having an annular wall of insulating properties formed substantially of a cellular plastic material.

The term "conduit" as used herein is intended to cover such hollow longitudinal products as pipes, ducts, tubing and the like having inner and outer peripheral surfaces of either cylindrical or prismatic configuration.

Recent developments in the preparation of flexible elastomeric cellular structures have resulted in new plastic products having excellent heat-insulative and shock-absorbing properties. Of interest are cellular products of polyurethane material formed from liquid polymeric reaction mixtures containing polyisocyanates. The reaction mixtures are polymeric materials which are either liquid at room temperature or capable of being melted at relatively low temperatures. The polymeric materials contain active hydrogen atoms which react with the isocyanate groups to form a network of cross-linked molecular chains. The polyisocyanate not only functions as a cross-linker or curative for the polymeric material but also reacts with water provided in the liquid reaction mixture to form carbon dioxide which causes the liquid reaction mixture to expand and foam, whereby a flexible, cellular structure is formed which retains its foamed cellular character after the polymer has been cross-linked or cured.

The reaction between the isocyanate and the water to form carbon dioxide and the reaction between the polyisocyanate and the polymeric material to effect a cure of the polymeric material takes place concurrently. The composition of the mixture is generally controlled so that, after the desired expansion of volume has been effected, curing obtains.

The foregoing materials have given rise to the production of foamed-in-place plastic shapes for use in electrical, shipping, aircraft and other industries where low density, high dielectric strength, high heat insulation, good shock absorbing and other properties are desired.

In producing foamed-in-place shapes, it has been necessary to employ rigid retaining means in order to obtain the desired surface configuration. For example, in producing conduits with the annular wall formed of foamed plastic, in order to make sure that the wall had the correct shape and that the inner and outer surface of the conduit would be substantially equally spaced from each other or substantially concentric, it was necessary to employ rigid retaining means or molding surface for both the inner and outer surface of the conduit. This method had its limitations in that it was difficult to produce long lengths of the conduit economically.

I have now found that I can overcome the foregoing difficulty by providing a method for producing conduits either by an intermittent or continuous process, whereby a rigid retaining means is not required for contouring the outer wall of the conduit. I have found that the surface retaining or molding means may be a sheet of flexible material which may become associated with the conduit itself as part of its surface structure upon the completion of the conduit-making process, or which may be removed upon completion of curing.

It is an object of my invention to provide a process for producing a conduit in which a polymerizable, foam-producing or expansible plastic mixture is employed as an essential ingredient of the conduit.

Another object is to provide a continuous method for producing a conduit having an annular wall of foamed plastic tightly covered with an envelope of flexible material.

Still another object is to provide a method for producing a conduit having substantially impervious inner and outer surfaces of flexible material.

A further object is to provide a method for producing a conduit having a reinforced annular wall of foamed plastic.

It is also the object of the invention to provide an apparatus combination for intermittently or continuously producing a conduit having an annular wall of foamed plastic.

Another object is to provide as an article of manufacture a conduit having good insulating and sound absorbing properties and also characterized by an annular wall of foamed plastic of high dielectric strength.

These and other objects will more clearly appear from the disclosure and the accompanying drawings, wherein:

FIG. 1 is illustrative of one apparatus combination for producing the conduit provided by the invention;

FIG. 1A shows the general arrangement of the gearing in that portion of the apparatus employed in helically coiling a wire reinforcement for the annular wall of the conduit;

FIGS. 1B and 1C show schematically several arrangements which may be employed to effect synchronous driving of the grooved wheels on the flanged bobbin assembly;

FIG. 2 shows somewhat diagrammatically the apparatus arrangement of FIG. 1 in the continuous production of conduits;

FIGS. 3 to 6 are sections taken along lines 3—3, 4—4, 5—5 and 6—6, respectively, of FIG. 1 illustrating the gradual production of the product at each step of the process;

FIG. 7 depicts one form of a conveyor supporting means and curing oven which may be employed in carrying out the invention;

FIG. 8 depicts another form of conveyor supporting means and curing oven similar to FIG. 7;

Figure 11:
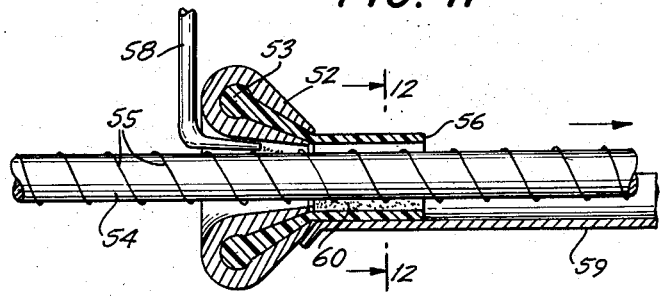
Figure 12:
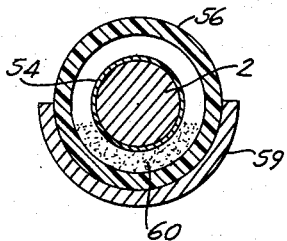
Figure 13:
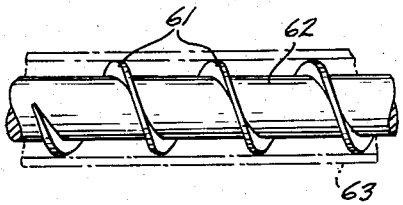
Figure 14:
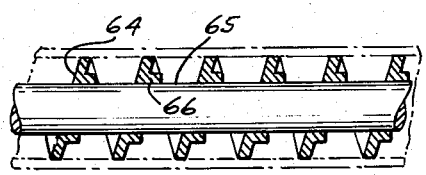
Figure 15:
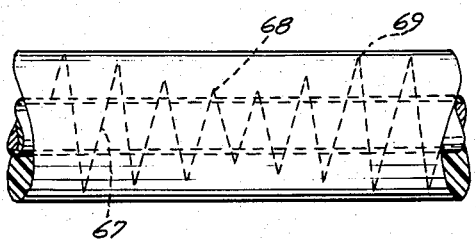

FIGS. 9 and 10 are sections taken through lines 9—9 and 10—10 of FIGS. 7 and 8, respectively, showing the configuration of the supporting surface used with the link belt conveyor;

FIG. 11 shows another means by which the outer covering of the conduit can be applied by extrusion through an annular die during the conduit-making process;

FIG. 12 is a section taken along line 12—12 of FIG. 11 showing the arrangement of the materials before foaming and curing has occurred;

FIG. 13 illustrates one type of helically wound reinforcement that can be used in producing a conduit with reinforced walls;

FIG. 14 shows one way by which a helically wound reinforcement can be attached to the inner surface of the conduit before the annular wall of the conduit is foamed in place;

FIG. 15 depicts another means of reinforcing the annular wall of the conduit substantially throughout its cross section by using helically wound wire varying in helical diameter throughout the cross-section of the conduit wall;

FIG. 16 illustrates another type of mandrel which utilizes a group of moving belts to define a retaining surface;

FIG. 17 illustrates a method of producing the conduit of the invention in which the conduit is built up around a flexible tubing which becomes part of the inner bore of the final conduit;

FIG. 18 illustrates the conduit produced by the method of FIG. 17; and

FIG. 19 shows one use of the conduit as a snap-on insulation for steam pipes.

Stating it broadly, in producing a conduit in accordance with my invention, I start with a surface retaining means corresponding to the inner surface of the conduit and then perform all the necessary steps about this surface retaining means. I surround the surface retaining means with a loose envelope of resilient material such as plastic sheathing, and fill the annular space with foaming elastomeric material and allow it to expand against the inner supporting surface and the envelope. In one embodiment of the invention, the surface retaining means may comprise a polished steel mandrel over which the inner wall portion of the conduit slides continuously as the outer covering of the conduit is being formed about the mandrel. The mandrel is made sufficiently long so that during the initial part of the process, the plastic mix foams, expands, fills up the annular space between the mandrel and the covering and polymerizes to a hardness sufficient to enable the conduit to be removed from the mandrel and conveyed to the next treating station.

Referring to the embodiment of FIG. 1, the upper portion of a mandrel support 1 is shown with mandrel 2 integral therewith, the mandrel terminating at 3. The mandrel passes over a suitably supported coil stand 4, the upper portion of which contains a coil 5 of flexible strip material 6, such as aluminum foil, which is drawn off through an open funnel-shaped collar or die 8 of steel or other suitable material, the exit port 9 of which substantially surrounds the mandrel. As the foil is pulled in the longitudinal direction of the axis of the mandrel, it is formed cylindrically about it as a tubular covering 10 by overlapping the edges while in sliding engagement with the mandrel. The mandrel and the foil covering passes through an opening 11 of a wire coiling machine 12, shown in more detail in FIG. 1A, which comprises a rotatably mounted bushing 13 assembled to annular roller bearing 14, the assembly being integral with driven annular gear 15. Gear 15 is connected to driving gear 16 of motor 17 via gear 18 or a suitable arrangement of a plurality of gears. A variable speed device and known clutch means may be provided in box 17a to control the coiling speed and/or to effect reverse drive. A flanged bobbin assembly 19 is provided with bobbin holding means 20 and 20a showing a bobbin of wire 21 mounted on holder 20 and a balancing bobbin blank 21a mounted on 20a, depending upon whether one or two bobbins of wire are employed. The bobbin assembly is provided with an annular arbor 22 adapted to be snugly and removably inserted into rotatable bushing 13 and held in place by keying means not shown.

A train of grooved wheels 23 and 23a are provided on the flanged bobbin assembly for drawing and guiding the wire off the bobbins and imparting thereon the required amount of radius of curvature corresponding to the curvature of the helix to be wound about foil covering 10 surrounding mandrel 2.

The wire-forming grooved wheels are preferably power driven so that their peripheral speed is related to the circumference of the helix and the pitch during the coiling of the wire. Several embodiments are shown schematically in FIGS. 1B and 1C. In the schematic view of 1B, the train of grooved wheels 23 are indicated as mechanically synchronized (note heavy dot and dash lines), the driving being effected by the motor shown which is operated by a variable speed control means. In the embodiment of FIG. 1C, a similar effect is achieved by utilizing the rotating motion of the flanged bobbin assembly 19. An annular gear 2a is fixed onto stationary mandrel 2 by means of key 2b. A spur gear 2c is rotatably mounted on the flanged bobbin assembly in meshing engagement with the fixed gear so that as the bobbin assembly rotates, gear 2c is driven by fixed gear 2a. The driven or spur gear is mechanically coupled to the grooved wheels as shown schematically by the heavy dot and dash lines whereby the rotation of all the grooved wheels is synchronized to the rotation of the wire coiling device. Similarly, the train of grooved wheels 23a shown on bobbin assembly 19 of FIG. 1 should likewise be power driven.

As the tubular foil slides over the mandrel, through the opening of the wire coiling machine, bobbin assembly 19 revolves about the mandrel at a controlled rate and, depending upon the rate of movement of the tubular foil over the mandrel and the r.p.m. of the bobbin assembly, winds a helix 21b of wire of a given pitch about the foil to reinforce it. The tubular foil with the wire coiled around it slides along the polished mandrel over coil stand 24 containing a coil 25 of flexible strip material 26, e.g., plastic strip, which like the foil is drawn off the coil through a similar forming collar or die 27 whose exit port 28 has an opening larger than that of the foil-forming collar adapted to form the outer covering into a diameter corresponding to that of the finished conduit.

Simultaneously with the forming of the outer covering, a given amount of foaming plastic is ejected from a nozzle 29 on strip 26 at the trough end of collar 27. As the strip passes through the collar, a longitudinal lap joint is prepared which passes over a heating unit 30 (preferably covered with polytetrafluoroethylene resin known in the trade as Teflon) and under pressure roll 31 comprising preferably either Teflon or Teflon coated steel, whereby the envelope loosely surrounding the foil is tightly heat sealed at the lap. If desired, heating unit 30 may have moving against it a Teflon endless belt power driven at a linear speed synchronous with the moving conduit, the envelope of the conduit being sealed at the lap joint by the heat passing from the heating unit through the Teflon belt. The foaming plastic which is quite viscous and which is carried at the bottom of the loose envelope begins to expand as the materials are drawn along a cylindrical channel 32 of support stand 33 (note FIGS. 5 and 6).

The plastic mix confined in the space formed between the inner foil surface and the outer plastic covering expands to many times its original volume and completely fills up the space and applies fluid pressure against the plastic covering. Because the pressure is fluidly applied in all directions, the outer covering tends to center itself so that it is substantially concentric with the inner foil surface. At this point of the process, the curing is timed to become effective. Referring to FIG. 1, it will be seen that the outer covering is somewhat loose at 34 and by the time it leaves the mandrel at 3, the plastic mix has fully foamed, expanded, and hardened sufficiently to enable the handling thereof without the use of the mandrel support.

The movement of the materials along the mandrel would be maintained after the process is set in motion by means of rubber gripping rolls 35 of FIG. 2 which shows diagrammatically the complete cycle of the process, gripping rolls 35 also being used to discharge finished conduit 36. Instead of the gripping rolls, an endless conveyor belt may be employed of the slide conveyor type made of cotton or rubber supporting a half cylinder pad of flexible foam plastic mounted on it, the cylindrical portion being used to cradle the conduit and carry it to the next station.

FIGS. 3 to 6 show the relation of the materials at each point of the process illustrated by FIG. 1. FIG. 3 which is a section taken along line 3—3 of FIG. 1 shows the mandrel 2 surrounded by aluminum foil 6. FIG. 4, taken along line 4—4, shows the mandrel surrounded by foil 6 which in turn is surrounded by a portion of wire helix 31b. FIG. 5 shows in cross section (line 5—5 of FIG.

1) the complete enveloping of the mandrel and foil 6 by loose plastic cover 34 heat sealed at lap joint 34a, the bottom of the envelope containing a portion of plastic mix 37 and being supported by cradle 32 of support 33. FIG. 6, taken along line 6—6, shows the cross section of the finished conduit after complete foaming and polymerization of the plastic mix 37, the conduit having an inner surface of aluminum foil 6 reinforced by wire 21b and having the outer covering 34 of plastic concentrically spaced from the inner surface as a result of the pressure balancing arising during the expansion of the plastic foam. In FIGS. 3 to 6, the thickness of the various elements mentioned above has been exaggerated for purposes of clarity.

As stated hereinbefore, it is important that the plastic foam mix be so controlled that the curing or polymerization of the mix occurs after the desired foaming has taken place. Curing may occur as a result of the sensible heat in the mix resulting exothermically from the reaction. Time of curing may range from 5 to 40 minutes depending upon the composition of the foaming mix and the catalyst used. Thus, it is important that the conduit, during the early stages of curing, be held in a relatively straight line by appropriate supports or conveyor means.

To decrease curing time and hence increase production rate, the curing may be effected in a curing oven maintained at an adequate temperature, the conduit being brought to and removed from the oven by supports connected to an endless link-belt conveyor. Such a system is illustrated in FIG. 7 which shows in section an oven 38 through which heated air is circulated which is brought into the oven at entrance conduit 39 at about 200° F. and leaves the oven at about 100° F. in the direction opposite to the movement of link belt conveyor 40, carried by sprocket gears 41, 42 driven by a motor or other suitable means. Link belt 43 has attached to it a plurality of cradle supports 44 partially indicated, the cross section of one of the cradles being shown in FIG. 9 taken along line 9—9 of FIG. 7. As a variation, a long tubular furnace may be employed in which the link belt or other conveyor is fully enclosed.

If desired, two link belts may be employed arranged one above the other, the belts being so arranged that the cradle of one cooperates with a cradle of the other to completely support the conduit about its periphery. Such an arrangement is shown in FIG. 8 comprising oven 45 with a pair of link belts 46, 47 carried by sprockets 48, 49 and 50, 51, respectively, each of the belts having attached thereto a plurality of support cradles 44 as partially shown, one coinciding with the other as shown in the cross section of FIG. 10 taken along line 10—10 of FIG. 8. The two belts would be synchronously operated by motor 52 driving sprockets 49 and 51. This type of conveyor system without the oven may also be used as a transport means for the conduit to carry it to the next treating station. For such use, the cradle may be made of resilient material such as a foam plastic or the like.

Instead of forming the outer covering of the conduit from plastic strip or other sheet material, it may be extruded directly as a tube from an annular die. The extruded product should be sufficiently stiff to enable handling during the subsequent processing steps and, preferably, should be quick curing. One such arrangement is shown in FIG. 11 which illustrates only that part of the process during which the outer covering is formed.

A hollow annular die 52 containing extrudable plastic 53 is provided suitably connected to a source of plastic not shown. Through the die opening passes the mandrel covered with a sliding tube of aluminum foil 54 or other material with a helix of reinforcing wire 55 wound about it. As the reinforced aluminum foil tubing slides along the mandrel, the covering 56 is extruded at the same rate of travel of the foil, the diameter of the covering corresponding to the O.D. of the finished conduit. At the same time a given amount of viscous foaming plastic 60 is ejected via nozzle 58 into the annular space formed between the aluminum foil surface and the extruded outer covering. In order to insure that the extruded outer covering does not substantially deform immediately after extrusion, a cradle support 59 is provided cylindrically shaped to the contour of the conduit or a moving belt system may be employed. This is more clearly illustrated in FIG. 12 which is a cross section taken along line 12—12 of FIG. 11 and which shows the mandrel 2 surrounded by a layer of aluminum foil 54 reinforced by wire 55 (shown only in FIG. 11) which in turn is surrounded by the newly extruded plastic covering 56 (the thickness exaggerated for clarity) containing at its bottom a foaming plastic mix 60, the materials being in turn tentatively supported by cradle 59 prior to being transported further on to a conveyor or the like. Depending on the type of plastic extruded, it may be necessary to wet the cradle with a fluid to enable the freshly extruded plastic to glide unhindered over the cradle. As a preferred embodiment, the conduit may be produced as shown in FIG. 1 by using a thin outer covering and, after the plastic has foamed and cured, extrude a heavy plastic coating as shown in FIG. 11.

If it is desired to make the conduit at a relatively rapid rate without using a long mandrel to maintain the desired amount of support and prevent deforming, it may be desirable in some cases to use other means for insuring that the annular space between the inner and outer wall of the conduit is maintained uniform at all times. One means of doing this (note FIG. 13) would be to wrap a strip of cardboard or like material 61 helically about the inner surface 62 spaced an inch or two apart, the edges of the strip of cardboard being perpendicular to both the inner and outer surface 63 of the conduit, the outer surface being phantomly indicated in dot and dash lines. To insure adhesion of the helically wound reinforcing cardboard to the surface, this may be done as shown in FIG. 14 by making the material in the shape of an L 64, with the bottom of the L in adhering contact with inner surface 65 at 66. If desired, the helical reinforcing structure may be further strengthened by using pleated material, such as pleated cardboard.

Helically coiled wire of varying helical diameters similar to a bed spring may also be used as one means of strengthening the annular wall of foamed plastic. A conduit of such structure is illustrated in FIG. 15 which shows a helical coil of wire 67 of varying helical diameters ranging from the diameter 68 of the inner surface to the diameter 69 corresponding to the O.D. of the conduit. Thus, the annular wall may be reinforced throughout its cross section by spring wire.

Instead of relying on the polished surface of a steel mandrel over which to slide the inner surface of the conduit, an alternative arrangement may be used comprising a hollow steel mandrel having a series of narrow belts running lengthwise over the surface of the mandrel and then over rollers at the end of the mandrel and returning inside the mandrel to the generating end of the machine. For example, the belts may be a half inch to one inch wide and spaced at such a distance apart at the surface of the mandrel as would cause them to almost touch each other at their edges as they return to the generating end through the inside of the mandrel. The forward end of such a mandrel is partially depicted in FIG. 16 as comprising 12 rollers 70 mounted within slots about the periphery of the wall of the mandrel, each roller having corresponding roller further back of the mandrel not shown over which belts 71 travel to the forward end of the mandrel and back through the hollow portion of the mandrel to the generating end. In effect, by means of the belts a moving substantially cylindrical-like surface is generated over which the inner surface of the conduit is formed and continuously moved to the next step of the process.

The conduit of the invention may be produced without using a mandrel as a support for the inner surface. I propose to use a hollow cylindrical means which becomes the inner surface wall of the final conduit. Such a material may be a flexible-type corrugated hose as shown in FIG. 17. Referring to this figure, a large drum 72 is shown from which a flexible hose 73 comprising aluminum foil and composition paper corrugated together is drawn off and passed between leveler rollers 74 and thence through the opening of support 75 to insure a straight cylindrical surface for the process. In effect, the hose is now used as a mandrel except it becomes part of the structure of the final product. The hose is passed over coil 76 containing a roll of plastic sheathing 77 which is drawn off through forming collar 78. A viscous foamable plastic is ejected from nozzle 79 into the trough formed by the plastic sheathing as it passes through the die. Because the foamable plastic is viscous, it does not tend to run off the trough but is carried up by the moving plastic strip into the annular space formed between the surfaces of the hose and the envelope emerging from the die opening 80. As the edges of the strip are lapped over at 81 above heat sealing unit 82, they are heat sealed together as they pass under pressure roller 83. The assembled materials are then drawn over the cradle of support 84 and supported until foaming has completed and the volume of the plastic mix expanded sufficiently to fill up the annular space and subsequently cured to the desired hardness. Where it is desired to accelerate the curing, the assembled materials may be passed through a curing oven of the type shown in FIGS. 7 and 8. The conduit produced by this method is shown in FIG. 18 as comprising a bore formed of flexible hose 73, outer plastic covering 77 and expanded foam plastic 85 completely filling the annular space therebetween. The foregoing conduit has excellent heat insulating properties, is capable of being bent around sharp turns, and has particular utility as a wrap-around, snap-on insulation for steam pipes as shown in FIG. 19, by cutting the conduit along the longitudinal element 86 and opening the conduit along this element for insertion around a steam pipe. It will be understood that FIG. 19 shows the conduit in stressed open condition, so that after placement over a pipe or the like it will resiliently snap into fully closed circumferential overlap of the pipe or the like.

As stated hereinbefore, the present invention is applicable as an example to the use of flexible, cellular structures formed from polyester-isocyanate reaction mixtures containing an active-hydrogen-containing polymeric material, a polyisocyanate and water. By the term "active-hydrogen" is meant those hydrogen atoms which are reactive as detected and determined by the Zerewitinoff method.

Examples of the active-hydrogen-containing polymeric materials are polyesters, polyesteramides, polyalkylene ether glycols, and mixtures of two or more of these. The polyesters and polyesteramides are preferably formed from bifunctional materials such as dibasic carboxylic acids, amino carboxylic acids, glycols, amino alcohols and diamines. Small amounts of trifunctional materials may optionally be employed in preparing the active-hydrogen-containing polymeric materials. Polyesters and polyesteramides having an average molecular weight of from approximately 1000 to 5000, and an acid number not greater than 5, and a hydroxyl number from 20 to 110, are preferred.

Any dibasic carboxylic acid, preferably those whose carboxyl groups are attached to terminal carbons, may be used to form the polyester or polyesteramide, including succinic, glutaric, adipic, pimelic, suberic, azelaic, sebacic, malonic, brassylic, tartaric, maleic, malic, fumaric, dilinoleic, thiodibutyric, diphenic, isophthalic, terephthalic, hexahydroterephthalic, p-phenylene diacetic, dihydromuconic, and beta-methyladipic acids.

Any glycol may be used in the formation of the polyester including ethylene, propylene-1,2; propylene-1,3; diethylene, triethylene, butylene, pentamethylene, hexamethylene, decamethylene, dodecamethylene, and N,N-diethanolaniline, glycerine mono ethers, and thiodiglycol.

Any amino alcohol having at least one hydrogen atom attached to the amino nitrogen atom may be employed including ethanolamine, 3-amino-propanol, 4-amino-butanol, 6-amino-hexanol, and 10-amino-decanol.

Examples of the diamines which may be used are ethylene, propylene-1,2, tetramethylene-1,4, hexamethylene-1,6, decamethylene-1,10, piperazine, isopropyl amino propyl amine, and 3,3'-diamino dipropyl ether. Listed below are the reactants which are used to form particular polyesters and polyesteramides:

(1) Ethylene glycol plus adipic acid.
(2) Propylene glycol-1,2 plus adipic acid.
(3) Ethylene glycol (80 mol percent) propylene glycol-1,2 (20 mol percent) plus adipic acid.
(4) Ethylene glycol (80 mol percent) propylene glycol-1,2 (20 mol percent) plus azelaic acid.
(5) Ethylene glycol (80 mol percent), propylene glycol-1,2 (20 mol percent) plus sebacic acid.
(6) Ethylene glycol (80 mol percent), propylene glycol-1,2 (20 mol percent) plus dilinoleic acid (20 mol percent), adipic acid (80 mol percent).
(7) Ethylene glycol (80 mol percent), glycerine monoethyl ether (20 mol percent) plus adipic acid.
(8) Ethylene glycol (80 mol percent), butylene glycol-1,4 (20 mol percent) plus adipic acid.
(9) Ethylene glycol (80 mol percent), propylene glycol-1,3 (20 mol percent) plus adipic acid.
(10) Ethylene glycol (80 mol percent), pentane diol-1,5 (20 mol percent) plus adipic acid.
(11) Ethylene glycol (80 mol percent) glycerine monoisopropyl ether (20 mol percent), plus adipic acid.
(12) Ethylene glycol (80 mol percent), propylene glycol-1,2 (from 18 to 5 mol percent), ethanol amine (from 2 to 15 mol percent) plus adipic acid.
(13) Ethylene glycol (80 mol percent), propylene glycol-1,2 (20 mole percent) plus maleic acid (from 3 to 6 mol percent), adipic acid (from 97 to 94 mol percent).
(14) Ethylene glycol (80 mol percent), propylene glycol-1,2 (from 19 to 17 mol percent), piperazine (from 1 to 3 mol percent) plus adipic acid.
(15) Ethylene glycol (80 mol percent), propylene glycol-1,3 (from 18 to 5 mol percent), dihydroxyethyl aniline (from 2 to 15 mol percent) plus adipic acid.
(16) Ethylene glycol (80 mol percent), butylene glycol-1,4 (20 mol percent) plus adipic acid.
(17) Ethylene glycol (80 mol percent), diethylene glycol (20 mol percent) plus adipic acid.
(18) Ethylene glycol (from 90 to 10 mol percent), propylene glycol-1,2 (from 10 to 90 mol percent) plus adipic acid.
(19) Ethylene glycol (from 90 to 10 mol percent), propylene glycol-1,2 (from 10 to 90 mol percent) plus azelaic acid.

Any organic polyisocyanate or mixtures of polyisocyanates may be empoyed. The amount of polyisocyanate should be at least sufficient to cross link the active-hydrogen-containing polymeric material and to react with the water present to form carbon dioxide gas. In general, it is preferred to use from 2 to 8 equivalents of isocyanate per mol of polymeric material. Representative examples of polyisocyanates which may be employed are the diisocyanates, such as hexamethylene diisocyanate, paraphenylene diisocyanate, meta phenylene diisocyanate, 4,4'-diphenylene methane diisocyanate, the tolylene diisocyanates, 4,4'-diphenyl ethyl diisocyanate, 3,3'-dimethyl 4,4'-diphenyl diisocyanate, and 3,3'-dimethoxy 4,4'-diphenyl diisocyanate; the triisocyanates, such as 4,4',4''-triphenyl methane triisocyanate, and toluene 2,4,6-triisocyanate, the tetraisocyanates, such as 4,4'-dimethyl-diphenyl methane 2,2',5,5'-tetraisocyanate; and mixtures of polyisocyanates, such as those described in U.S. Patent No. 2,683,730. Of these 3,3'-dimethyl, 4,4'-diphenyl diisocyanate, 3,3' dimethoxy 4,4' diphenyl diisocyanate and the tolylene diisocyanates are particularly preferred.

The water in the reaction mixture is provided to form the carbon dioxide gas for foaming as well as to form possible points of cross-linking the polymeric material.

Other types of expanded cellular materials may be employed, for example, cellular polyvinyl chloride expanded by means of a chemical blowing agent which is added to a prepared polyvinyl chloride composition and the mix heated to decompose the blowing agent followed by expansion and then curing. Or, if desired, an expansible styrene head may be used. Both flexible and rigid foams may be employed in the final product.

It is possible, by controlling the composition, to obtain volume changes ranging up to 60 times the original volume of the plastic. The density of the annular foamed plastic, depending upon the change in volume and upon the confining effect of the outer cover may range from about one to 60 lbs./cu. ft.

As has been pointed out above, many variations and modifications may be resorted to within the broad concept of the invention. It has ben shown that, as one embodiment of carrying out the invention, a long cantilevered mandrel of polished steel may be used; or, if desired, a relatively short mandrel may be used extending just past the foaming region but sufficient to enable the forming of the conduit using reinforcing structures for the annulus, such as cardboard rings or convolutions surrounding the inner retaining surface or the outside of the mandrel. The convolutions may also be made of prepolymerized plastic foam. If a wire helix is employed, it may be either wound on the mandrel first and the inner wall of the conduit formed over it or vice versa.

Instead of a mandrel, a flexible tube of plastic, reinforced paper, fibers or other composition may be used. If desired, the flexible tube may have air pressure applied in its bore to stiffen the tube during the processing. As illustrated in FIG. 17, a relatively stiff tube of any material may be employed and the conduit formed around it.

While the method illustrated in FIGS. 1 to 6 refers to aluminum foil as a material for the inner surface, it will be appreciated that other materials may be employed, such as woven fiber glass, plastic sheeting (polyethylene, polyvinyl chloride, etc.), certain types of composition paper, etc. Likewise, any of the foregoing materials may be used as the outside covering. Where sheet materials such as paper and the like are used, an adhesive may be employed in sealing the envelope formed around the inner surface.

One of the advantages of using a plastic foam as the filler material, is its tendency to adhere after curing to the boundary skins forming the inner and outer walls of the conduit. By using skins substantially impervious to fluids, the conduit may be employed for conducting liquid air, hot air, liquid oxygen, liquid hydrogen and other fluids where heat insulation is an important factor.

Throughout the specification reference is made to porous plastic constituting the annular wall of the conduit. By "porous" is meant that condition which prevails in a material which contains a plurality of voids, such as foam or vesicular, whether or not the voids are in communication with each other. The term "plastic" is meant to include any elastomeric composition capable of forming an expansible mix and of being cured in the expanded state such as polyurethane, polyvinyl chloride, styrene or the like, beads, rubber and other elastomeric materials.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A method of producing a hollow cylindrical conduit having an annular wall of expanded porous plastic comprising an inner and an outer surface which comprises providing a smooth mandrel whose surface corresponds peripherally to the inner surface of the conduit, forming about said mandrel a tubular covering in sliding engagement therewith constituting the inner surface of said conduit, surrounding said inner surface with an envelope of flexible sheet material whose peripheral length corresponds substantially to that of the outer surface of the conduit, adding a foaming plastic mixture to the space formed between the tubular covering and the surrounding envelope in an amount sufficient to fill said space after the mixture has foamed, carrying out the foaming of said mixture against the tubular covering supported by said mandrel and against the envelope of flexible material whereby to fill said space, polymerizing said mixture to form a conduit having an annular wall of polymerized porous plastic tightly covered with said envelope material, and removing said conduit from the mandrel.

2. A method of producing a hollow cylindrical conduit having an annular wall of expanded porous plastic comprising an inner and an outer surface which comprises providing a flexible tubular support whose surface corresponds peripherally to the inner surface of the conduit, forming about said tubular support an envelope of flexible sheet material whose peripheral length corresponds substantially to that of the outer surface contour of the conduit, adding a foaming plastic mixture to the space formed between the tubular support and said envelope in an amount sufficient to fill said space after the mixture has foamed, carrying out the foaming of said mixture against the surface of the tubular support and the flexible envelope whereby to fill said space, and polymerizing said mixture whereby a conduit is formed having an annular wall of polymerized porous plastic surrounding said flexible tubular support and tightly covered with said envelope material.

3. A method of continuously producing a conduit having an annular wall of foamed plastic comprising an inner surface and an outer surface which comprises providing a smooth mandrel whose surface corresponds to the inner surface contour of the conduit to be produced, forming about said mandrel a tubular covering of flexible material which is supported by said mandrel, moving said tubular covering along said mandrel, forming about said tubular covering an envelope of flexible sheet material whose peripheral length corresponds substantially to that of the outer surface contour of the conduit, moving said envelope coincidentally with the movement of said tubular covering, adding a viscous, polymerizable fluid of a foaming plastic mixture to the space formed between the surface of the tubular covering and the envelope in an amount at least sufficient to fill said space after the mixture has foamed, carrying out the foaming of said mixture against the mandrel-supported tubular covering and the envelope about it, and polymerizing said mixture at substantially the completion of the foaming whereby a conduit is formed having an annular wall of polymerized foamed plastic.

4. The method of claim 3 wherein said foaming plastic mixture is added as a polyester-isocyanate mixture.

5. The method of claim 3 wherein aluminum foil is formed as a tubular covering over the mandrel and wherein a sheath of plastic material is formed as an envelope around said tubular covering.

6. The method of claim 5 wherein a reinforcing element is wound helically about said mandrel-supported tubular foil prior to applying the surrounding envelope.

7. A method of continuously producing a conduit having an annular wall of foamed plastic comprising an inner surface and an outer surface which comprises providing a supporting surface comprising a flexible tubular support corresponding to the inner surface contour of the conduit, moving said tubular support along its longitudinal axis, forming about said moving support an envelope of flexible sheet material whose peripheral length corresponds substantially to that of the outer surface contour of the conduit, moving said envelope coincidentally with the movement of said tubular support, adding a viscous, polymerizable fluid of a foaming polyester-isocyanate mixture to the space formed between the tubular support and the envelope in an amount sufficient to fill said space after the mixture has foamed, carrying out the foaming of said foamable mixture against said tubular support and the envelope about it, polymerizing said mixture whereby a conduit is formed, and continuously discharging said conduit after completion of polymerization.

8. A method of continuously producing a conduit having an annular wall of foamed plastic comprising an inner and an outer surface which comprises providing a smooth mandrel whose surface corresponds to the inner surface contour of the conduit to be produced, forming about said mandrel a tubular covering of flexible material which is supported by said mandrel, moving said tubular covering along said mandrel, winding helically about said moving mandrel-supported tubular covering a reinforcing element to provide a reinforced covering, forming about said reinforced covering an envelope of flexible sheet of plastic material whose peripheral length corresponds substantially to that of the outer surface contour of the conduit, moving said envelope coincidentally with the movement of said reinforced covering, adding a viscous, polmerizable fluid of a foaming plastic mixture to the space formed between the reinforced covering and the surrounding envelope in an amount sufficient to fill said space after the mixture has foamed, carrying out the foaming of said mixture against said reinforced covering supported by said mandrel and the envelope about it, and then polymerizing said mixture whereby a conduit is formed having an annular wall of polymerized foamed plastic.

9. Apparatus for producing a cylindrical conduit having an annular wall of porous plastic comprising an inner surface and an outer surface formed of an envelope of flexible material which comprises, mandrel means forming a cylindrical supporting surface corresponding to the inner surface of said conduit, means for forming a flexible sheet material into a tubular covering about said cylindrical supporting surface, means for forming a flexible sheet material into an envelope spaced from but completely surrounding said supported tubular covering and provide an annular space therebetween, means for inserting a polymerizable, expansible plastic mixture into the annular space between said tubular covering and said surrounding envelope and means for supporting said envelope including the plastic mixture within said annular space until said plastic mixture has expanded, completely filled said space and polymerized.

10. Apparatus for producing a cylindrical conduit having an annular wall of foamed plastic comprising an inner surface and an outer surface formed of an envelope of flexible material which comprises, mandrel means forming a supporting surface corresponding to the inner surface of said conduit, means for forming a flexible sheet material into a tubular covering about said mandrel so as to provide a mandrel supported covering, means for helically applying a reinforcing element adjacent the peripheral surface of said tubular covering, means for forming a flexible sheet material into an envelope spaced from but completely surrounding said mandrel supported tubular covering and provide an annular space therebetween, means for inserting a polymerizable, foamable plastic mixture into the annular space between said tubular covering and said surrounding envelope, means for supporting said envelope and the plastic mixture within the annular space until said plastic mixture has foamed, completely filled said space and polymerized to form a conduit, and means for discharging the conduit upon completion of polymerization.

11. Apparatus for producing a conduit having an annular wall of foamed plastic comprising an inner surface and an outer surface formed of an envelope of material, mandrel means forming a supporting surface corresponding to the inner surface of said conduit, means for forming a flexible sheet material into a tubular covering about said mandrel so as to provide a mandrel supported covering, die means for extruding a tubular envelope spaced from but completely surrounding said mandrel supported tubular covering and provide an annular space therebetween, means for inserting a polymerizable, formable plastic mixture into the space between said tubular covering and said surrounding envelope, means for supporting said envelope and the plastic mixture within said annular space until said plastic mixture has foamed and completely filled said space and until polymerization of the foamed material is substantially complete to form the conduit, and means for discharging the conduit upon completion of polymerization.

12. Apparatus for producing a conduit having an annular wall of foamed plastic comprising an inner surface and an outer surface formed of an envelope of flexible material which comprises, mandrel means forming a supporting surface corresponding to the inner surface of said conduit, means for supporting a coil of flexible sheet material, means for drawing said flexible material from said coil, means for forming said flexible sheet material into a tubular covering about said mandrel so as to provide a mandrel-supported covering, means for supporting a coil of reinforcing element, means for removing said reinforcing element from said coil and applying it helically about the peripheral surface of said tubular covering to provide a helically reinforced tubular covering, means for supporting a coil of flexible sheet material, means for drawing said flexible material from said coil, means for forming said flexible sheet material into an envelope spaced from but completely surrounding said mandrel-supported, helically reinforced tubular covering and provide an annular space therebetween, means for inserting a polymerizable, foamable plastic mixture into the space between said tubular covering and said surrounding envelope, means for supporting said envelope and the plastic mixture within said annular space until said plastic mixture has foamed, completely filled said space and polymerized to form a conduit, and means for discharging the conduit upon completion of polymerization.

13. The apparatus of claim 10 wherein heating means are provided for accelerating polymerization of said foamed plastic.

References Cited in the file of this patent

UNITED STATES PATENTS

| | | |
|---|---|---|
| 1,349,290 | Murdock | Aug. 10, 1920 |
| 2,319,042 | De Wyk | May 11, 1943 |
| 2,552,641 | Morrison | May 15, 1951 |
| 2,620,514 | Sampson | Dec. 9, 1952 |
| 2,642,920 | Simon et al. | June 23, 1953 |
| 2,780,350 | Simon et al. | Feb. 5, 1957 |
| 2,800,683 | Teichmann | July 30, 1957 |
| 2,810,424 | Swartswelter et al. | Oct. 22, 1957 |
| 2,828,239 | Fischer | Mar. 25, 1958 |
| 2,857,931 | Lawton | Oct. 28, 1958 |
| 2,910,730 | Risch | Nov. 3, 1959 |
| 2,924,245 | Wilson | Feb. 9, 1960 |
| 2,927,622 | Butler et al. | Mar. 8, 1960 |
| 2,936,812 | Roberts | May 17, 1960 |
| 2,941,570 | Plym | June 21, 1960 |
| 2,954,803 | Barnes et al. | Oct. 4, 1960 |